United States Patent [19]

Bollen et al.

[11] 4,107,251

[45] Aug. 15, 1978

[54] PRODUCTION OF FILMS AND SHEETS OF POLYESTER-POLYCARBONATE BLENDS

[75] Inventors: Philip Stuart Bollen, Auburn; Surendra A. Amin, Pottsville, both of Pa.

[73] Assignee: Allied Chemical Corporation, Morris Township, Morris County, N.J.

[21] Appl. No.: 692,696

[22] Filed: Jun. 3, 1976

Related U.S. Application Data

[62] Division of Ser. No. 552,496, Feb. 24, 1975, Pat. No. 3,975,355.

[51] Int. Cl.² ............................................. B29C 17/04
[52] U.S. Cl. .................................. 264/171; 260/40 R; 260/860; 264/92; 264/176 R; 264/322; 264/331
[58] Field of Search ............................ 260/40 R, 860; 264/176 R, 92, 322, 171, 331

[56] References Cited

U.S. PATENT DOCUMENTS

| | | | |
|---|---|---|---|
| 3,218,372 | 11/1965 | Okamura et al. | 260/860 |
| 3,429,854 | 2/1969 | Siggel et al. | 264/322 |
| 3,479,318 | 11/1969 | Jackson et al. | 260/40 R |
| 3,629,381 | 12/1971 | Walker | 264/92 |
| 3,745,140 | 7/1973 | Segal | 260/40 R |
| 3,833,685 | 9/1974 | Wambach | 260/DIG. 24 |
| 3,889,039 | 6/1975 | Wainer | 260/40 R |
| 3,975,485 | 8/1976 | Bollen et al. | 264/92 |
| 4,020,126 | 4/1977 | Gander et al. | 264/92 |

*Primary Examiner*—Jeffery R. Thurlow
*Attorney, Agent, or Firm*—Henry E. Naylor; Roger H. Criss

[57] ABSTRACT

This invention provides a film or sheet capable of being thermoformed into a shaped article and being formed from a blend of about 60 to 85 parts by weight of a polyethylene terephthalate having an intrinsic viscosity of at least about 0.90, about 15 to 40 parts by weight of a polycarbonate and about 5 to 20 parts by weight of a non-acidic silica filler, such as novaculite, the polyethylene terephthalate portion of the film or sheet having a degree of crystallinity in the range of about 20 to 40%. The present invention also provides compositions for forming such films and sheets and shaped articles thermoformed from such films or sheets, such as cook-in-trays. This invention also provides a process of forming such films or sheets.

11 Claims, No Drawings

PRODUCTION OF FILMS AND SHEETS OF POLYESTER-POLYCARBONATE BLENDS

This is a division, of application Ser. No. 552,496, filed Feb. 24, 1975, now U.S. Pat. No. 3,975,355.

BACKGROUND OF THE INVENTION

1. Field of the Invention

This invention relates to films and sheets formed from blends of polyethylene terephthalate and polycarbonate resins useful as cook-in-trays.

2. Discussion of the Prior Art

Our U.S. Pat. application with William Sacks, Ser. No. 489,017 filed July 16, 1974, U.S. Pat. No. 3,956,229 describes films and sheets formed from blends of polyethylene terephthalate and polycarbonate resins and their production. Such films and sheets are useful to form cook-in-trays which are substitutes for aluminum and other conventional trays. As described in said application, a film or sheet is formed from a blend of about 60 to 85 parts by weight of polyethylene terephthalate having an intrinsic viscosity of at least about 0.90 and correspondingly about 40 to 15 parts by weight of a polycarbonate, with the polyethylene terephthalate fraction having a degree of crystallinity in the range of about 20 to 40%.

It has now been found that while such compositions are suitable for use as cooking containers, in some cases the trays exhibit an initial distortion while in the oven, which detracts from their aesthetic appearance. This distortion is believed to be caused by a slight initial softening and subsequent shrinkage of the trays as further crystallization of the polyethylene terephthalate occurs. It would be desirable if films and sheets could be formed from such compositions which, when formed into cook-in-trays and placed in an oven, do not exhibit a distortion in shape.

SUMMARY OF THE INVENTION

This invention provides a film or sheet, capable of being thermoformed into a shaped article, formed from a blend, in parts by weight percent, of about 60 to 85 parts of a polyethylene terephthalate having an intrinsic viscosity of at least about 0.90, about 15 to 40 parts of a polycarbonate and about 5 to 20 parts of a non-acidic silica filler, the polyethylene terephthalate portion of the film or sheet having a degree of crystallinity in the range of about 20 to 40%. The film is essentially non-oriented. The present invention also provides shaped articles thermoformed from such film or sheet, such as cook-in-trays. Moreover, this invention provides a process of forming such film or sheet which comprises the steps of blending about 60 to 85 parts by weight of a polyethylene terephthalate polymer having an intrinsic viscosity of at least about 0.90 with about 15 to 40 parts by weight of a polycarbonate and about 5 to 20 parts by weight of the silica filler, extruding the resultant blend at a temperature of about about 500° F onto a moving support such as a casting roll while maintaining the surface of the support at a temperature of about 225° to 380° F whereby a film or sheet of the blend is formed, and collecting the thus formed film or sheet.

This invention also provides film- and sheet- forming compositions which comprise about 60 to 85 parts by weight of a polyethylene terephthalate having an intrinsic viscosity of at least about 0.90, about 15 to 40 parts by weight of a polycarbonate and about 5 to 20 parts by weight of a non-acidic silica filler.

In addition, this invention also provides, in one embodiment, a composition comprising a polycarbonate and about 20 to 40 percent by weight of a non-acidic silica filler, such as novaculite, and in another embodiment, also including about 5 to 20 percent by weight of the total composition of a pigment, such as titanium dioxide.

The film or sheet may be molded by conventional molding techniques, such as thermoforming, into shaped articles such as cook-in-trays which possess a high degree of toughness and impact resistance and exhibit an improved resistance to distortion at elevated temperatures.

DESCRIPTION OF THE PREFERRED EMBODIMENT

As mentioned above, the film or sheet of this invention is formed from a specific blend of a polyethylene terephthalate, a polycarbonate and non-acidic silica filler. The terms "film" and "sheet" are intended to mean thin cast, extruded or otherwise formed products. In general, the term "film" denotes thin structures having a thickness of up to about 10 mils whereas the term "sheet" denotes thin structures having a thickness of 10 mils or above. The film or sheet of this invention have a thickness in the range of 1 to 50 mils, preferably 5 to 25 mils and more preferably 10 to 20 mils.

The polyethylene terephthalate and polycarbonate resins useful herein are described in the aforementioned patent U.S. Pat. No. 3,956,229, the disclosure of which is expressly incorporated herein.

The polyethylene terephthalate (hereinafter "PET") employed herein is a polymer having an instrinsic viscosity of at least about 0.90, the intrinsic viscosity being measured in a mixed solvent of 60 parts by weight phenol and 40 parts by weight tetrachloroethane at 25° C. Preferably, the intrinsic viscosity is in the range of about 0.9 to 1.2, more preferably about 0.9 to 1.0. Such PET polymers melt in their crystallized state at about 490° to 525° F. The polycarbonate employed herein may be any polycarbonate such as the reaction product of phosgene or a carbonic acid diester with bisphenol A, i.e., poly(4,4'-isopropylidene diphenylene carbonate). The polycarbonate may have an intrinsic viscosity in the range of about 0.4 to 1.2 as measured in dioxane solvent at 30° C. Such polycarbonates are essentially non-crystalline and soften at about 275°–350° F. The intrinsic viscosities referred to herein are the viscosities measured before blending the two polymers.

Silica fillers which can be incorporated herein are silica materials which are "non-acidic" in an aqueous dispersion. By "non-acidic", it is meant that the pH of such dispersion is not less than about 6 and preferably is in the range of about 6 to 10. It has been found that silica fillers that are acidic are not acceptable in the present compositions since they degrade either or both of the polymers.

An especially preferred silica filler which may be employed herein is novaculite. Novaculite is a microcrystalline form of α-quartz which is found in useable quantities in and around the Devonian-Mississippian deposits of Hot Springs, Arkansas in the United States. Under the petrographic microscope, the grains of quartz are seen to possess smooth, very slightly curved surfaces. Large particles are clusters of crystals which are easily broken down into smaller grains. The particle shape of novaculite is believed to be unique among all other forms of quartz. Particles are generally square or rectangular in outline, and in three-dimensional aspect might be designated as pseudo-cubic or rhombohedronic. Novaculite is closely related to chert and flint, although mineralogical inspection reveals significant differences in crystalline form, since fine-sized particles of chert or flint, or most other forms of fine quartz, possess irregular, jagged outlines and edges. The particle size of the novaculite useful in this invention can range up to a maximum of about 100μ, preferably less than about 25μ. There is no minimum particle size although, in fact, particles less than 1μ in size are comparatively rare. Most preferred particle sizes range from about 3 to 12μ.

Other silica fillers which may be employed herein include diatomaceous earth. As pointed out above, such silica containing materials are non-acidic in an aqueous dispersion. To be useful in the present invention, a filler must be compatible with both polymers and must of course meet applicable regulations governing products which contact food.

An example of silica fillers which are unsatisfactory for use herein are certain pure grades of silicon dioxide formed by hydrolysis of silicon tetrachloride; such materials are sufficiently acidic to cause breakdown of the polycarbonate molecule (as is evidenced by bubble formation in the sheet or film). Additionally, other common fillers such as calcium carbonate likewise degrade either or both polymers.

The PET, polycarbonate and silica filler are blended to provide a preferably uniform blend of about 60 to 85 parts by weight PET, about 15 to 40 parts by weight polycarbonate and about 5 to 20 parts by weight silica. Preferred compositions comprise 65 to 80 parts by weight PET, about 20 to 35 parts by weight polycarbonate and about 5 to 15 parts by weight silica. Blends containing less than about 15 parts by weight polycarbonate result in films and sheets which have inadequate impact and fracture resistance. Blends containing less than about 60 parts by weight PET have relatively poor heat resistance and poor thermoformability as well as present problems in obtaining uniform optical properties. Blends containing less than about 5 parts by weight silica do not exhibit improved heat distortion resistance whereas blends of more than about 20 parts by weight silica result in brittle films and sheets and poor uniformity.

The two polymers may be blended together using any conventional blending apparatus. They may be blended in the solid or melted state; preferably the PET and polycarbonate are dry blended in pellet form at about room temperature. The duration of the mixing is primarily dependent upon the desired degree of blend uniformity. Blending may be performed prior to or in the extruder. The silica may be added in any conventional manner and may suitably be added to either the PET or polycarbonate separately or after the polymers are blended.

Conventional additives may be added during the mixing operation. Such additives include pigments, such as titanium dioxide and carbon black, and stabilizers. The amount of such additives may of course vary; it has been found, for example, that a composition including about 1 to 5% by weight of titanium dioxide may be used to form a very aesthetically attractive cook-in-tray.

In one preferred embodiment, the silica filler together with optional additives may be blended into one of the polymers, preferably the polycarbonate, and then blended with the other polymer which may contain the remainder, if any, of the filler or additives. For example, a blended composition may be prepared which comprises polycarbonate and about 20 to 40, more preferably 25 to 35, percent by weight of the non-acidic silica filler, preferably novaculite. This filled polycarbonate composition may be blended with an amount of unfilled or partially silica-filled PET to obtain the desired blended composition. In another embodiment, if titanium dioxide pigment is utilized, the polycarbonate composition may also include about 5 to 20, preferably 5 to 10, percent by weight of such pigment. The pigmented composition may then be blended with the requisite amount of unfilled or filled PET.

Since both PET and polycarbonate polymers are hygroscopic, preferably the blended mixture is dried at elevated temperatures (e.g., above 212° F) for a sufficient period of time. For example, the blend may be dried at 200° to 300° F for about 1 to 18 hours in a circulating hot air oven.

The blend is formed into a film or sheet by extrusion of a molten mixture. Preferably, the blend is charged to a screw extruder wherein the blend is melted and additional mixing occurs and the film or sheet exits through a flat die head. Conventional film or sheet extruders may be utilized for this purpose. Preferred extrusion temperatures are above about 500° F, preferably 510° to 600° F. The extrudate exiting the die head is passed onto a moving support such as a rotating casting or cooling roll which serves to cool the molten layer into a coherent film or sheet. Conventional casting rolls may be employed for this purpose, such as chromium plated rolls. As is well understood by those skilled in the art, the rate of extrusion, the width of the extruder die orifice and the speed of the moving support may be varied widely and determine the thickness of the film.

The surface temperature of the rotating support is maintained in the range of about 225° to 380° F, preferably 250° to 360° F by providing the support with heating means. This can readily be accomplished, for example, by providing a heat transfer fluid within the interior of the casting roll or the like in a conventional manner.

Following extrusion onto the moving support, the film or sheet may be further cooled down prior to collecting the same by passing the film or sheet over one or more additional moving supports, such as additional rolls, in a manner generally employed for extrusion of films and sheets. Such additional rolls may be heated or unheated. However, any such additional moving supports move or rotate at substantially the same linear speed as the first moving support so that the film or sheet is not subjected to a drawing or stretching operation which would orient the same. The film or sheet is collected using conventional apparatus, such as a winding roll or the like.

The film or sheet of this invention is essentially non-oriented, that is, shrinks less than 5% in the machine and transverse directions after 10 minutes at temperatures above about 400° F, and is partially crystallized. As discussed above, the PET portion of the film or sheet is partially crystallized, with a crystallinity in the range of about 20 to 40%. The crystallinity referred to is that obtained by the well-known density method as described in "Engineering Design for Plastics," E. Baer, Reinhold Publishing Co., 1964, pp. 98–99. This partial crystallinity results from utilizing the above disclosed range of surface temperatures on the support onto which the film or sheet is extruded (e.g., casting roll). For example, crystallinities in the range of 35-40% can be obtained using a casting roll temperature of about 350° F; 25-30% at 300° F and 20-25% at 250° F.

It has been determined that when the crystallinity of the blended film or sheet is below about 20% the thermal resistance thereof is unacceptable. That is, articles molded from such film or sheet, such as cook-in-trays distort when subjected to elevated temperatures. For instance, cook-in-trays thermoformed from the blended film or sheet have low heat resistance when exposed to temperatures above 300° F, e.g., cooking temperatures. Such trays become distorted and shrink in the oven, with a minimum result of an unaesthetically appealing product and the possibility of spill-over of the contained food during cooking. When the crystallinity level is above about 40%, articles formed from the film or sheet have low impact and fracture resistance. This is especially a problem with cook-in-trays which are designed to be frozen with the contained food; inadvertent dropping of such trays may result in their fracture if the crystallinity level is above about 40%.

It has been additionally found that films and sheets produced from a PET polymer having an intrinsic viscosity of at least about 0.90 have increased toughness as compared to films and sheets produced from a PET polymer having an intrinsic viscosity below about 0.90. Additionally, the higher intrinsic viscosity provides improved processibility of the film and sheets in terms of easier extrusion and better control of thickness.

Since the film or sheet of the invention is essentially non-oriented, it may be drawn, molded or shaped to a high degree with short cycle times despite the product being partially crystallized. Such shaped articles as trays, cups, bowls, and the like can be readily formed from such film or sheet using conventional shaping equipment. For example, film or sheet in roll form may be rapidly thermoformed on conventional thermoforming machines into cook-in-trays and the like. A typical commercial thermoforming machine softens the film or sheet and forces it by pressure into the desired shape. Typical thermoforming temperatures useful in forming shaped articles from the film or sheet of this invention may range from about 250 to 500° F, with a thermoforming cycle of about 1 to 10 seconds followed by a cooling cycle of about 1 to 10 seconds. The resultant shaped articles exhibit a high toughness and high heat resistance. Cook-in containers so produced are essentially distortion-free at temperatures above 300° F to as high as 400° F or greater.

U.S. Pat. No. 3,745,140 issued in 1973 to Segal suggests the use of novaculite as a filler for low molecular weight polyethylene terephthalate which has a preferred weight average molecular weight of 10,000 to 35,000 (the latter being equivalent to an intrinsic viscosity of about 0.83). However, the polymer employed therein is a non-molding grade polyethylene terephthalate and there is no suggestion of including novaculite in mixtures of PET and polycarbonate or that such mixtures are useful to form films and sheets that can be thermoformed into cook-in-trays having improved heat distortion resistance.

The following non-limiting examples are given to further illustrate the present invention:

EXAMPLES

A blend of 67 parts by weight of PET having an intrinsic viscosity of 0.95, 19 parts by weight polycarbonate having an intrinsic viscosity of 0.56 (measured in dioxane at 30° C), 10 parts by weight of novaculite (average particle size of 5.5 microns) and 4 parts of a 50:50 titanium dioxide-polycarbonate master batch (the polycarbonate also having an intrinsic viscosity of 0.56) was prepared and dried for 3 hours at 250° F and then drum tumbled immediately prior to extrusion. The blend was extruded from a single 2½ inch diameter screw extruder through a 30 inch wide flat sheeting die into a steel casting roll maintained at 350° F. The speed of the roll was controlled to provide a sheet of 17 mil thickness.

The physical properties of the sheet were measured and are reported in Table 1 under Sample 1. A comparative 17 mil sheet was formed in the same manner except that novaculite was not present in the blend. Its physical properties are reported in Table 1 under Sample 2.

TABLE 1

| Property | Sample 1 | Sample 2 |
|---|---|---|
| Tensile strength, psi (machine direction) | 7000–8000 | 8000–9500 |
| Tensile modulus, psi (machine direction) | 283,000–288,000 | 250,000–260,000 |
| Oxygen Permeability at 25° C, cc./100in.²/24 hrs/atm. | 0.6 | 1.4 |
| Water Vapor Transmission, g/100 in.²/24 hrs. at 100° F, 90% RH | 0.23 | 0.23 |
| Shrinkage at 400° F, 10min.,% machine direction | 1.0 | 2.0 |

Trays were thermoformed from sheet Samples 1 and 2 using a commercial thermoforming machine, with a 4 second heating time and a 3 second cooling time. The trays measured 5¼ × 4 × 1 inch deep and had a ¼ inch rim around the top.

The trays were tested for resistance to distortion and shrinkage in an oven as follows: Three fish sticks measuring 3¾ by ¾ inch diameter were placed in each tray. The trays were heated in a 350° F oven for ½ hour and allowed to cool to 75°–80° F. The volume of the tray before the oven test was determined by measuring the volume of water required to fill the tray just to its rim. Similarly the volume of trays after heating at 350° F was determined and the change in volume calculated. Additional tests were made on trays formed from Samples 1 and 2 and heated to 375° F and 400° F for ½ hour. The results are shown in Table 2.

TABLE 2

| Sample | Volume Reduction, % | | |
|---|---|---|---|
| | 350° F | 375° F | 400° F |
| 1 | 5.5 | 7 | 10 |
| 2 | 12.4 | 12.8 | 13.7 |

As can be seen from Table 1, the addition of 10% by weight novaculite does not significantly adversely affect the physical properties of the sheet and in some cases improved properties are noticed. Table 2, however, demonstrates a significant and unexpected decrease in the volume reduction in trays when 10% novaculite is incorporated into the sheet. At 350° F, which is a usual cooking temperature, the volume reduction was decreased by over 50% (from 12.4 to 5.5%) and large decreases were also measured at 375° and 400° F oven temperatures. Accordingly, trays incorporating the present filler exhibit a much superior appearance with a greatly reduced distortion over trays not incorporating such fillers. The distortion of the comparative trays is particularly noticed in the rim area.

It is to be understood that variations and modifications of the present invention may be made without departing from the scope of the invention. It is also understood that the invention is not to be interpreted as limited to the specific embodiment disclosed herein, but only in accordance with the appended claims when read in light of the foregoing disclosure.

We claim:

1. A process of forming a film or sheet capable of being thermoformed into a shaped article, said process comprising the steps of:
    (a) blending about 60 to 85 parts by weight of a polyethylene terephthalate having an intrinsic viscosity of at least about 0.90 with about 15 to 40 parts by weight of a polycarbonate polymer and about 5 to 20 parts by weight of a non-acidic silica filler having a particle size of from about 1 micron to about 100 microns;
    (b) extruding the resultant blend at a temperature above about 500° F. onto a moving support while maintaining the surface of said support at a temperature of about 225° to 380° F. whereby a film or sheet of the blend is formed; and
    (c) collecting said film or sheet, said film or sheet being essentially nonoriented and the polyethylene terephthalate fraction of said film or sheet having a degree of crystallinity in the range of about 20 to 40 percent.

2. The process of claim 1 wherein said surface is maintained at a temperature of about 250° to 360° F.

3. The process of claim 1 wherein titanium dioxide pigment is blended with said other ingredients.

4. The proces of claim 1 including the step of drying said blend prior to extrusion.

5. The process of claim 1 wherein said film or sheet is not subjected to any substantial stretching forces after formation thereof and prior to said collecting, whereby a non-oriented film or sheet is produced.

6. The process of claim 1 wherein about 65 to 80 parts by weight of said polyethylene terephthalate are blended with about 20 to 35 parts by weight of polycarbonate, about 5 to 15 parts by weight of novaculite filler having a particle size less than about 20 microns and about 1 to 5 percent by weight of titanium dioxide.

7. The process of claim 6 wherein said polycarbonate is poly(4,4'-isopropylidene diphenylene carbonate).

8. The process of claim 1 wherein said silica filler is novaculite.

9. The process of claim 8 wherein said polycarbonate is preblended with about 20 to 40 percent by weight of said novaculite and said preblended composition is thereafter blended with said polyethylene terephthalate which optionally contains novaculite.

10. The process of claim 9 wherein said polycarbonate is preblended with about 20 to 40 percent by weight of said novaculite and 1 to 20 percent by weight of titanium dioxide pigment and said preblended composition is thereafter blended with said polyethylene terephthalate which optionally contains novaculite.

11. The process of claim 6 wherein said extrusion temperature is in the range of about 510° to 600° F.

* * * * *